(12) United States Patent
Ito

(10) Patent No.: US 12,196,121 B2
(45) Date of Patent: Jan. 14, 2025

(54) DRIVE SYSTEM

(71) Applicant: ISUZU MOTORS LIMITED, Yokohama (JP)

(72) Inventor: Hikaru Ito, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 18/439,845

(22) Filed: Feb. 13, 2024

(65) Prior Publication Data

US 2024/0280041 A1 Aug. 22, 2024

(30) Foreign Application Priority Data

Feb. 22, 2023 (JP) ................... 2023-025874

(51) Int. Cl.
| | |
|---|---|
| *F01N 5/04* | (2006.01) |
| *B60W 20/15* | (2016.01) |
| *F02B 37/18* | (2006.01) |

(52) U.S. Cl.
CPC ............... *F01N 5/04* (2013.01); *B60W 20/15* (2016.01); *F02B 37/18* (2013.01); *B60W 2510/0638* (2013.01); *B60W 2510/0657* (2013.01)

(58) Field of Classification Search
CPC ............ F01N 5/02; F01N 5/04; B60W 20/15; B60W 2510/0638; B60W 2510/0657; F02B 37/18; F02D 41/0007; Y02T 10/12; Y02T 10/40; Y02T 10/62; Y02T 10/64; Y02T 10/72; Y02T 10/70; Y02T 10/7072
See application file for complete search history.

(56) References Cited

U.S. PATENT DOCUMENTS

| | | | | |
|---|---|---|---|---|
| 4,774,811 | A * | 10/1988 | Kawamura | F02B 37/04 903/905 |
| 9,732,681 | B2 * | 8/2017 | Haughton | F01N 5/04 |
| 2001/0054416 | A1 | 12/2001 | Yoshizaki | |
| 2009/0031724 | A1 * | 2/2009 | Ruiz | F01K 13/02 60/661 |
| 2011/0018267 | A1 * | 1/2011 | Oriet | F02G 5/02 290/43 |
| 2012/0017585 | A1 | 1/2012 | Shimizu | |
| 2012/0273288 | A1 | 11/2012 | Yamazaki | |
| 2014/0172207 | A1 * | 6/2014 | Akashi | B60L 50/16 180/65.265 |

(Continued)

FOREIGN PATENT DOCUMENTS

| | | |
|---|---|---|
| JP | 2000-045817 A | 2/2000 |
| JP | 2001-329902 A | 11/2001 |
| JP | 2002-038962 A | 2/2002 |

(Continued)

*Primary Examiner* — Dapinder Singh
(74) *Attorney, Agent, or Firm* — Shih IP Law Group, PLLC

(57) ABSTRACT

A drive system including a motor that includes stator coils and a rotor having permanent magnets, a battery that supplies electric power to the stator coils of the motor, an engine that rotates a drive shaft connected to the rotor to generate a driving force of a vehicle, a generator that generates electric power by using exhaust of the engine, and a control part that controls a power source of the electric power to be supplied to the stator coils, wherein the electric power generated by the generator is supplied to the stator coils when an operating state of the engine satisfies a predetermined condition.

6 Claims, 6 Drawing Sheets

(56) References Cited

U.S. PATENT DOCUMENTS

2020/0398818 A1 12/2020 Nagamine
2020/0398819 A1 12/2020 Higuchi

FOREIGN PATENT DOCUMENTS

| | | |
|---|---|---|
| JP | 2009-126303 A | 6/2009 |
| JP | 2010-180708 A | 8/2010 |
| JP | 2013-181393 A | 9/2013 |
| JP | 2014-051199 A | 3/2014 |
| JP | 2014-117962 A | 6/2014 |
| JP | 2015-229930 A | 12/2015 |
| JP | 2016-175498 A | 10/2016 |
| JP | 2017-145748 A | 8/2017 |
| JP | 2017-178006 A | 10/2017 |
| JP | 2020-128134 A | 8/2020 |
| JP | 2022-164093 A | 10/2022 |
| WO | 2010098360 A1 | 9/2010 |
| WO | 2012081272 A1 | 6/2012 |
| WO | 2019073561 A1 | 4/2019 |
| WO | 2019116589 A1 | 6/2019 |

\* cited by examiner

… (1) …

DRIVE SYSTEM

CROSS-REFERENCE TO RELATED APPLICATIONS

The present application claims priority to Japanese Patent Applications number 2023-025874, filed on Feb. 22, 2023. The contents of this application are incorporated herein by reference in their entirety.

BACKGROUND OF THE INVENTION

It is widely practiced to improve vehicle performance by combining a motor and an internal combustion engine (for example, see Japanese Unexamined Patent Application Publication No. 2020-128134).

BRIEF SUMMARY OF THE INVENTION

In the technology described in Japanese Unexamined Patent Application Publication No. 2020-128134, rotational resistance increases due to back electromotive force being generated in a motor in a state in which a vehicle is traveling at high speed. As a result, there was a problem that the engine speed would not increase. To reduce the back electromotive force of the motor, it is conceivable to reduce the rotational resistance by bringing the motor into a state close to a no-load state by generating a magnetic flux in a direction opposite to a magnetic field generated by a magnet in the motor. However, if electric power is supplied from a battery to electromagnets in the motor to generate such magnetic flux, that would result in a reduction of energy efficiency of the vehicle.

The present disclosure focuses on this point, and its object is to provide a drive system capable of increasing the engine speed while improving energy efficiency of a vehicle.

A drive system according to an aspect of the present disclosure includes: a motor that includes stator coils and a rotor having permanent magnets; a battery that supplies electric power to the stator coils of the motor; an engine that rotates a drive shaft connected to the rotor to generate a driving force of a vehicle; a generator that generates electric power by using exhaust of the engine; and a control part that controls a power source of the electric power to be supplied to the stator coils, wherein the control part supplies the electric power generated by the generator to the stator coils when an operating state of the engine satisfies a predetermined condition.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

Outline of a Vehicle

Figure 1:
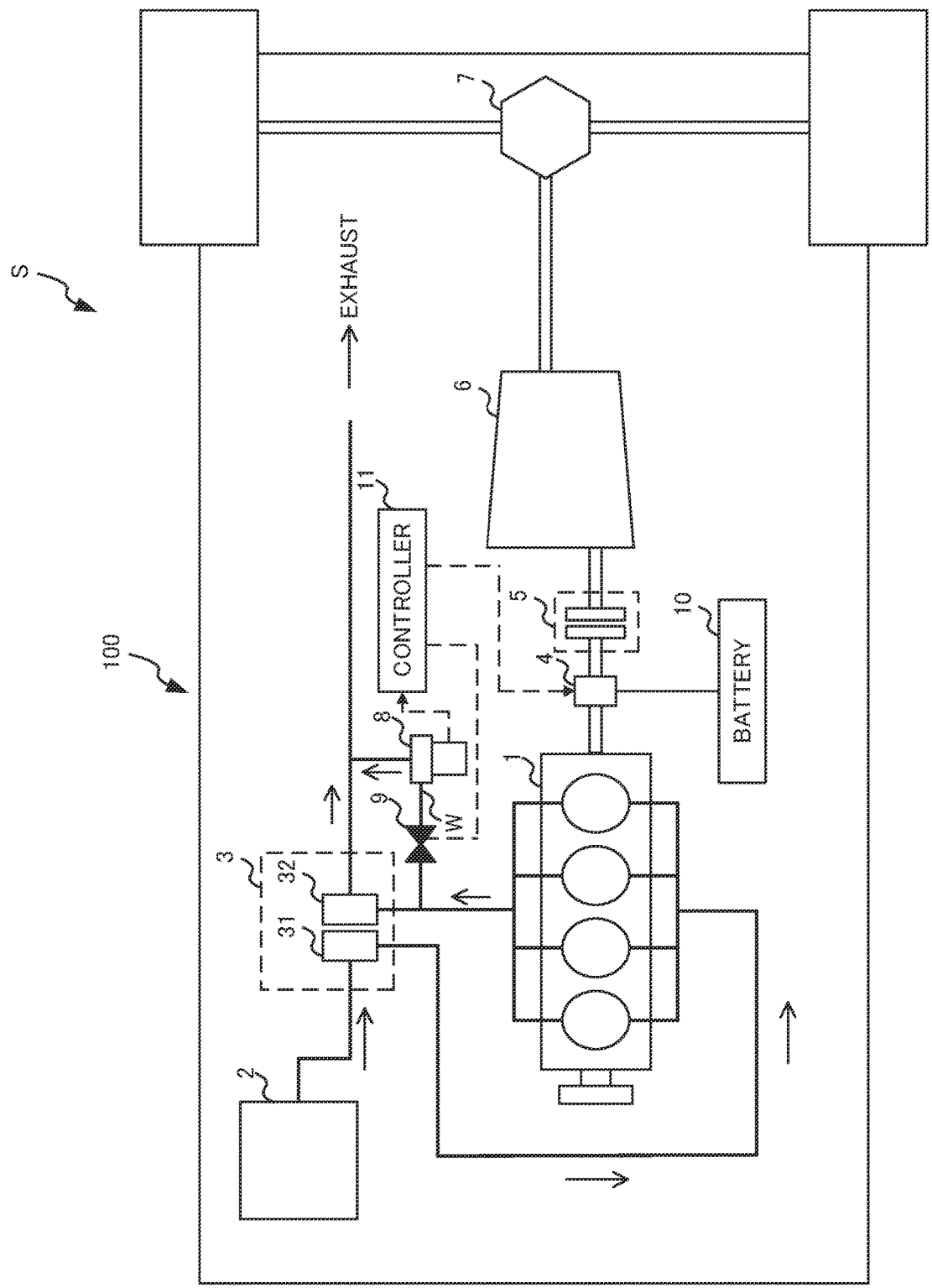
FIG. 1 shows a configuration of a vehicle according to an embodiment.

FIG. 1 shows a configuration of a vehicle 100, which is an example of a drive system S of the present embodiment. The vehicle 100 includes an engine 1, an air cleaner 2, a turbocharger 3, a motor 4, a clutch 5, a transmission 6, a differential gear 7, a generator 8, a switching part 9, a battery 10, and a controller 11. In the example of FIG. 1, air drawn from the outside through the air cleaner 2 passes through a compressor 31 of the turbocharger 3, the engine 1, and a turbine 32 of the turbocharger 3 in this order, and is discharged to the outside.

The engine 1 is connected to a drive shaft of the vehicle 100, and rotates the drive shaft to generate a driving force for propelling the vehicle 100. The air cleaner 2 is a filter that removes dust from the air drawn from the outside. The turbocharger 3 includes the compressor 31 and the turbine 32 which rotate in conjunction with each other. The turbocharger 3 uses a flow of exhaust from the engine 1 to rotate the turbine 32. By rotating together with the turbine 32, the compressor 31 pushes the air drawn through the air cleaner 2 into the engine 1.

The motor 4 generates the driving force for propelling the vehicle 100. The motor 4 is provided on or around a flywheel of the engine 1, for example. The motor 4 assists the driving force of the engine 1. The motor 4 also operates as a generator. For example, the motor 4 operates as a regenerative brake during braking to generate electric power. The motor 4 has three-phase stator coils as a stator. A rotor of the motor 4 is provided with a rotor having permanent magnets. The motor 4 is a permanent magnet synchronous motor (PM motor), for example. In the motor 4, a magnetic flux is generated when an AC current flows through the stator coils and rotates the rotor. The rotor is connected to the drive shaft. By generating driving force, the motor 4 assists the driving force generated by the engine 1.

The clutch 5 switches whether to transmit the driving force generated by the engine 1 or the driving force generated by the motor 4 to the transmission 6. The transmission 6 increases a torque generated by the engine 1 and transmits the torque to a tire by changing a combination of gears. The differential gear 7 causes a tire that is on the outer side to rotate relatively quickly and a tire that is on the inner side to rotate relatively slowly when the vehicle 100 turns.

The generator 8 is a micro turbine generator, for example. The generator 8 is provided in a bypass circuit W for discharging the exhaust from the engine 1 to the outside without passing through the turbine 32. The generator 8 generates electric power by using the exhaust from the engine 1. The generator 8 generates the electric power by using the rotation of the turbine as the exhaust passes through the bypass circuit W. The generator 8 is not limited to the example in which it is provided in the bypass circuit W. For example, the generator 8 may be provided on the same shaft as the turbine 32 of the turbocharger 3, and may generate electricity by rotating together with the turbine 32.

The switching part 9 switches between guiding the exhaust from the engine 1 to the turbine 32 of the turbocharger 3 and guiding the exhaust to the bypass circuit W. The switching part 9 is a wastegate valve for adjusting an amount of the exhaust flowing into the turbine 32, for example.

The battery 10 stores electric power to be supplied to the stator coils of the motor 4. The battery 10 stores the electric power generated by the motor 4 when the motor 4 operates as the generator. The controller 11 includes a processor. The controller 11 includes an HEV (Hybrid Electric Vehicle) controller, for example. The controller 11 executes a process of assisting the engine 1 with the motor 4 and a power generation process performed by the generator 8, for example. The controller 11 executes a power generation process by using the motor 4 as well.

When the rotational speed of the engine 1 is high, the rotational speed of the drive shaft connected to the engine 1 is increased, and the rotational speed of the motor 4 is increased. In other words, the engine 1 causes co-rotation of the motor 4. In the motor 4, a rotating magnetic flux is generated near the stator coils when the permanent magnets of the rotor rotate, and as a result, a current flows through the stator coils. That is, back electromotive force is generated in the motor 4. In the motor 4, due to the generated back electromotive force, a magnetic flux in a direction to cancel out the rotating magnetic flux generated by the rotor is generated from the stator coils. The magnetic flux generated by the stator coils acts as resistive force to the rotation of the rotor. This results in reduction of driving efficiency of the vehicle 100 with respect to driving of the engine 1. Further, since a difference between a voltage applied to drive the motor 4 and the back electromotive force generated in the motor 4 becomes small, the rotational speed of the motor 4 is less likely to increase.

In order to suppress influences of the back electromotive force generated at the time of high rotation of the motor 4 as described above, "field weakening control (weak field control)" is known. The field weakening control controls a magnetic flux by applying a motor current having a phase that cancels out a rotating magnetic flux generated by permanent magnets. Specifically, the controller 11 reduces a magnetic flux density of an air gap of the motor 4 by generating a magnetic flux in a direction opposite to the magnetic flux generated in the motor 4. The controller 11 suppresses the generation of back electromotive force by reducing the magnetic flux density of the air gap of the motor 4. The controller 11 suppresses a decrease in the voltage applied to the stator coils due to the back electromotive force by applying electric power in a direction opposite to the back electromotive force. However, since the field weakening control requires electric power to be supplied to the stator coils, there is a problem in that consumption of a remaining battery power is accelerated if electric power is supplied from the battery every time the engine 1 rotates at a high speed.

By supplying the electric power generated by the generator 8 to the motor 4, the controller 11 according to the present disclosure realizes suppressing rotational resistance of the motor 4 from increasing while suppressing power consumption of the battery 10. Since the controller 11 supplies the electric power generated by having the generator 8 use the exhaust from the engine 1 to the motor 4, energy efficiency of the vehicle 100 can be improved as compared with the case where electric power from the battery 10 is supplied to the motor 4.

Configuration of Main Parts of the Vehicle 100

Figure 2:
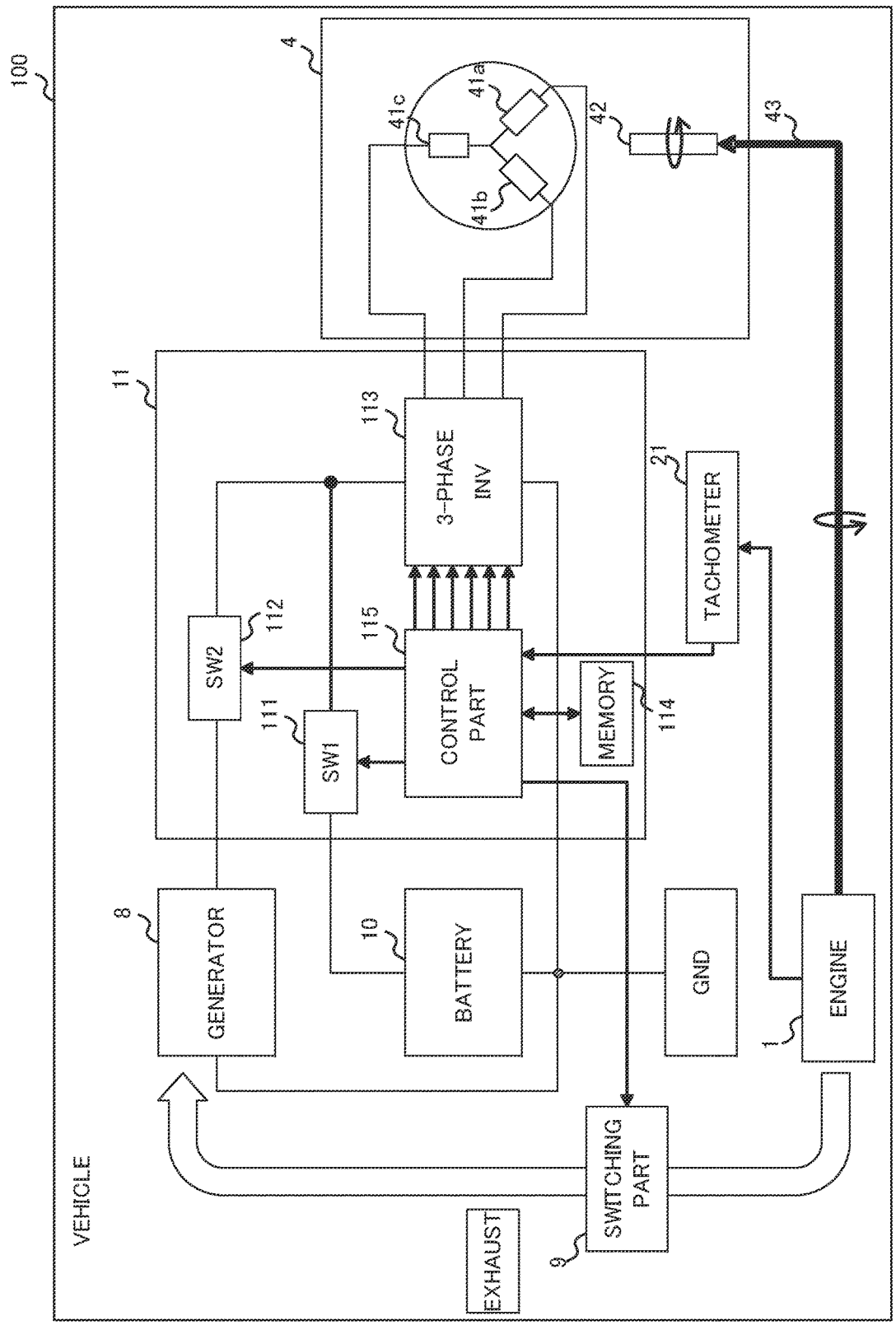
FIG. 2 shows a configuration of main parts of the vehicle.

FIG. 2 shows a configuration of main parts of the vehicle 100. The vehicle 100 includes the engine 1, the motor 4, the generator 8, the switching part 9, the battery 10, the controller 11, and a tachometer 21. The motor 4 includes three-phase stator coils 41a to 41c and a rotor 42. The controller 11 includes a first switch (SW1 in FIG. 2) 111, a second switch (SW2 in FIG. 2) 112, a three-phase inverter (three-phase INV in FIG. 2) 113, a memory 114, and a control part 115. An open thick arrow in FIG. 2 indicates that the exhaust of the engine 1 is guided by the switching part 9 through the bypass circuit W (see FIG. 1) to rotate the turbine of the generator 8.

The tachometer 21 measures the rotational speed of the engine 1. The tachometer 21 inputs the measured rotational speed to the control part 115. The stator coils 41a to 41c are electromagnets provided in the stator of the motor 4. The rotor 42 is permanent magnets provided on the rotor of the motor 4. The rotor 42 rotates about a drive shaft 43. The drive shaft 43 is connected to the engine 1 and rotates along with the engine 1.

The first switch 111 switches whether to supply the electric power from the battery 10 to the motor 4 via the three-phase inverter 113. The second switch 112 switches whether to supply the electric power generated by the generator 8 to the motor 4 via the three-phase inverter 113. The memory 114 includes a ROM (Read Only Memory), a RAM (Random Access Memory), and the like, for example.

The three-phase inverter 113 generates a rotating magnetic field by supplying the electric power to the three-phase stator coils 41a to 41c to rotate the rotor 42. The memory 114 stores various types of programs for causing the control part 115 to function and various types of data.

The control part 115 is a processor mounted on the controller 11, for example. The control part 115 executes various functions by executing the programs stored in the memory 114. The control part 115 acquires the rotational speed of the engine 1 measured with the tachometer 21. The control part 115 identifies an engine torque on the basis of the acquired rotational speed of the engine 1.

Figure 3:
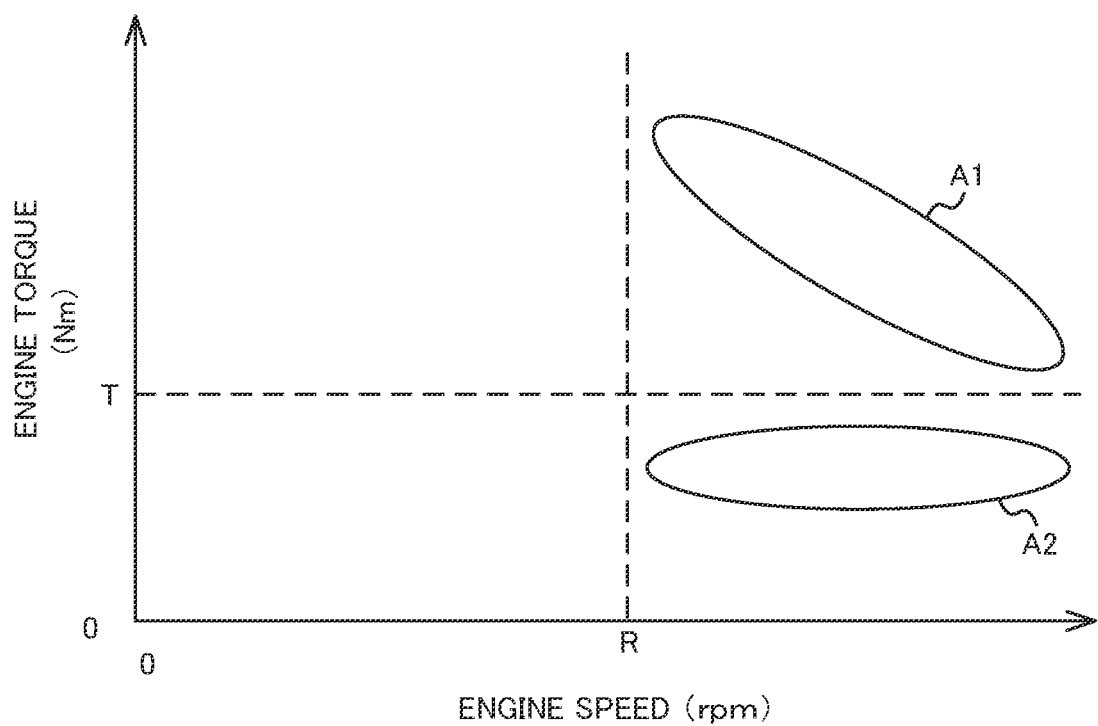
FIG. 3 illustrates timings for switching exhaust routes with a control part.

By controlling the switching part 9, the control part 115 switches whether to guide a portion of the exhaust of the engine 1 to the bypass circuit W. FIG. 3 illustrates conditions for switching exhaust routes with the control part 115. The vertical axis of FIG. 3 represents the engine torque. The units of the engine torque are newton-meters (Nm). The horizontal axis of FIG. 3 represents the rotational speed of the engine 1. The units of the rotational speed of the engine 1 are rpm (revolutions per minute).

As indicated by an ellipse A1 in FIG. 3, in a case where the rotational speed of the engine 1 is equal to or greater than a rotation threshold R and the engine torque is equal to or greater than a torque threshold T, the control part 115 guides a portion of the exhaust to the bypass circuit W with the switching part 9 in order to suppress over-rotation or supercharging pressure of the turbine 32 from increasing beyond an allowable value. At this time, when the exhaust guided to the bypass circuit W passes through it, the generator 8 generates electric power. On the other hand, as indicated by an ellipse A2 in FIG. 3, the control part 115 does not guide the exhaust to the bypass circuit W with the switching part 9 in a state where the rotational speed of the engine 1 is equal to or greater than the rotation threshold R and the engine torque is less than the torque threshold T. At this time, the generator 8 does not generate electric power.

In a state where the rotational speed of the engine 1 is relatively high, since the motor 4 rotates due to co-rotation, back electromotive force is generated by a magnetic flux generated by the rotor 42. Since the motor 4 acts as rotational resistance due to the back electromotive force, the rotational speed of the engine 1 is less likely to increase. The control part 115 supplies the electric power generated by the generator 8 to the stator coils when an operating state of the engine 1 satisfies a predetermined condition, in order to suppress the generation of back electromotive force. By supplying the electric power generated by the generator 8 to the stator coils 41a to 41c of the motor 4, the control part 115 reduces a magnetic flux density of the magnetic flux generated by the rotor 42 of the motor 4, by using the field weakening control.

Figure 4:
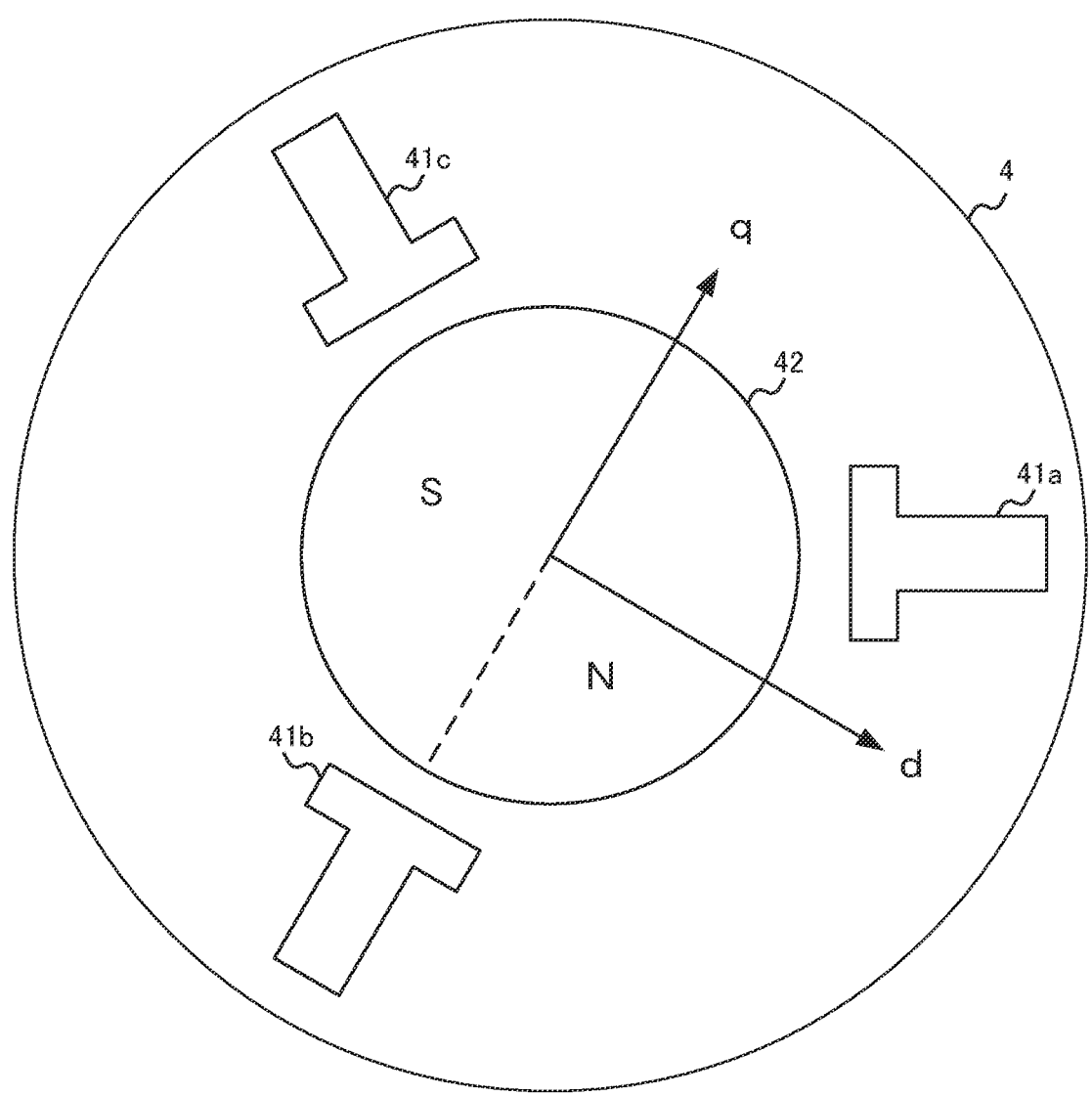
FIG. 4 shows an example of field weakening control.

FIG. 4 shows an example of the field weakening control. The control part 115 generates a rotating magnetic field by switching the current flowing through the stator coils 41a to 41c, which are arranged at 120° intervals, according to the rotation of the rotor 42, and causes the rotor 42 to rotate. The torque received by the rotor 42 is proportional to the intensity of the current flowing through any of the stator coils 41a to 41c. In vector control of the motor 4, the current flowing through the stator coils 41a to 41c is treated as a vector extending in the axial direction of the stator coils 41a to 41c.

As shown in FIG. 4, a magnetic flux direction of the permanent magnets of the rotor 42 having the N pole and the S pole is defined as a d-axis, and the direction perpendicular to the d-axis is defined as a q-axis. The control part 115 controls the rotor torque by controlling a q-axis current while maintaining a d-axis current at 0 amperes in a state in which the field weakening control is not performed in the vector control of the motor 4. The control part 115 reduces the magnetic flux density by causing the d-axis current to flow in a negative direction in the field weakening control. The control part 115 calculates voltage to be applied to the three-phase stator coils 41a to 41c on the basis of the d-axis current and the q-axis current. The control part 115 applies the calculated voltage to the three-phase stator coils 41a to 41c via the three-phase inverter 113.

In an example of the present specification, when the rotational speed of the engine 1 is equal to or greater than the rotation threshold R, the control part 115 supplies the electric power to the stator coils 41a to 41c to perform the field weakening control, thereby reducing the density of magnetic flux generated by the rotor 42 of the motor 4. At this time, the control part 115 controls the power source of electric power supplied to the stator coils 41a to 41c. When the engine torque is equal to or greater than the torque threshold value T, the control part 115 supplies the electric power generated by the generator 8 to the stator coils 41a to 41c.

On the other hand, when the engine torque is less than the torque threshold value T, the control part 115 supplies the electric power from the battery 10 mounted on the vehicle 100 to the stator coils 41a to 41c because the generator 8 does not generate electric power. Therefore, the control part 115 can increase the rotational speed of the engine 1 even when the engine torque is relatively low.

As described above, the control part 115 performs field weakening control in a case where the rotational speed of the engine 1 or the rotor is equal to or greater than the rotation threshold R. In a case where the rotational speed of the engine 1 or the rotor 42 is equal to or greater than the rotation threshold R and the engine torque is equal to or greater than the torque threshold T, the control part 115 applies an output voltage of the generator 8 to the three-phase inverter 113, and supplies the electric power to the stator coils 41a to 41c through the three-phase inverter 113. At this time, the control part 115 controls the switching part 9 to introduce the exhaust of the engine 1 into the generator 8 so that the generator 8 generates electric power.

More specifically, the control part 115 controls the first switch 111 to be in a non-connected state and the second switch 112 to be in a connected state. In this manner, the control part 115 supplies the electric power generated by the generator 8 to the stator coils 41a to 41c. Therefore, the control part 115 can suppress rotational resistance of the motor 4 while suppressing the power consumption of the battery 10.

On the other hand, in a case where the rotational speed of the engine 1 or the rotor 42 is equal to or greater than the rotation threshold R and the engine torque is less than the torque threshold T, the control part 115 applies the output voltage of the battery 10 to the three-phase inverter 113, and supplies the electric power to the stator coils 41a to 41c through the three-phase inverter 113. Specifically, the control part 115 controls the first switch 111 to be in a connected state and controls the second switch 112 to be in a non-connected state. In this manner, the control part 115 does not supply the electric power generated by the generator 8 to the stator coils 41a to 41c. It should be noted that in a case where the rotational speed of the engine 1 or the rotor 42 is less than the rotation threshold R, the control part 115 does not perform field weakening control because the influence of the resistance due to the rotating magnetic flux is small. A known method can be used to determine the current in the field weakening control.

In a case where the generator 8 is provided on the same shaft as the turbine 32 of the turbocharger 3, or the like, the control part 115 cannot use the switching part 9 to switch whether or not the generator 8 generates electricity. At this time, the control part 115 may switch whether or not to supply the electric power generated by the generator 8 to the stator coils 41a to 41c by switching the connected state of the second switch 112 and the non-connected state of the second switch 112.

The control part 115 is not limited to the example of switching whether or not to supply the electric power generated by the generator 8 to the stator coils 41a to 41c by switching the connected state of the second switch 112 and the non-connected state of the second switch 112. Instead of the second switch 112, the control part 115 may be provided with an auxiliary inverter (not shown), which is different from the three-phase inverter 113, between the generator 8 and the three-phase inverter 113.

The control part 115 may switch whether or not to supply the electric power generated by the generator 8 to the stator coils 41a to 41c by switching between a state in which the auxiliary inverter is operating and a state in which the auxiliary inverter is not operating.

Processing Procedure for Controlling the Motor 4 Performed by the Controller 11

Figure 5:
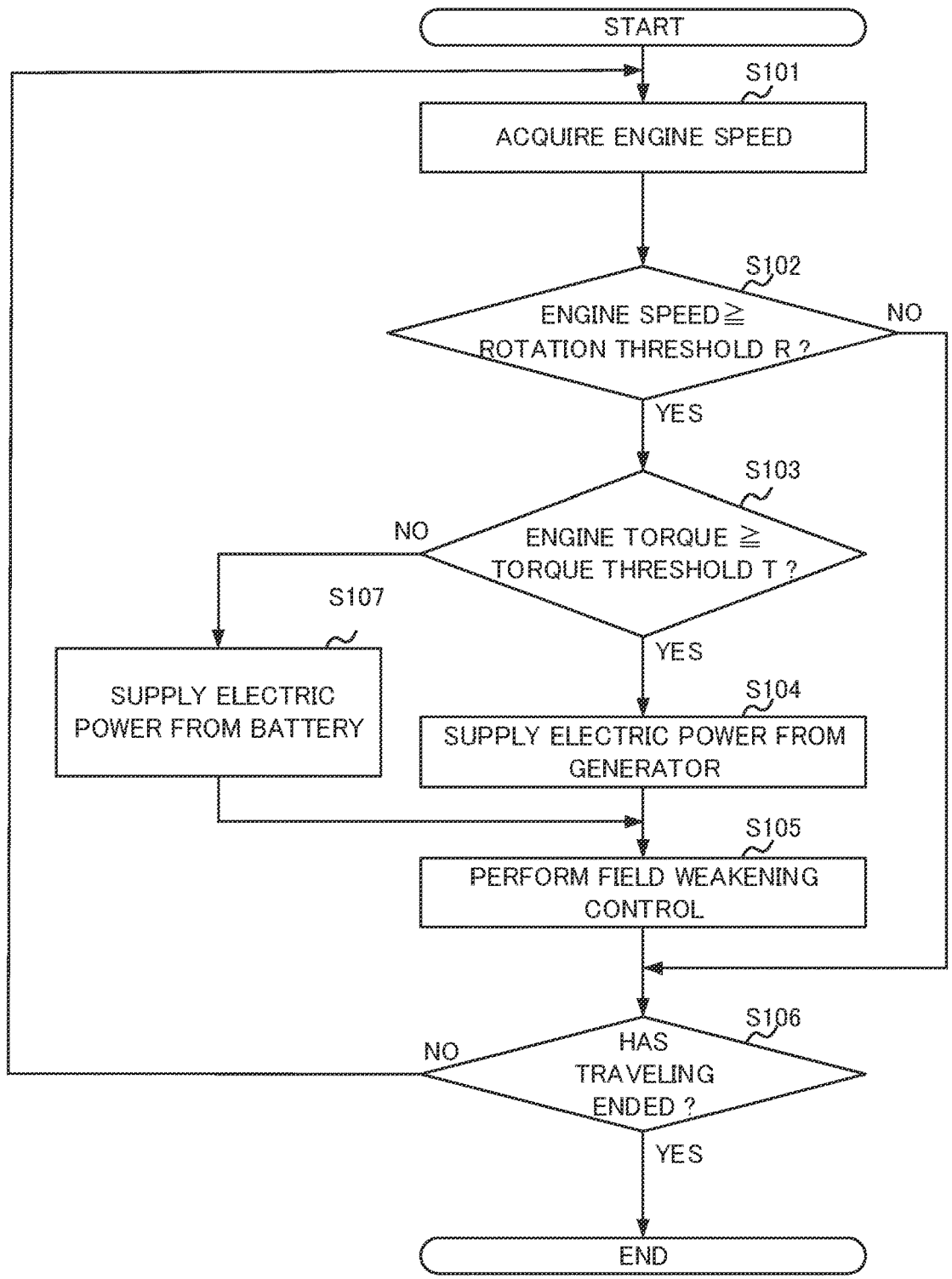
FIG. 5 is a flowchart showing a processing procedure for controlling a motor performed by a controller.
Figure 6:
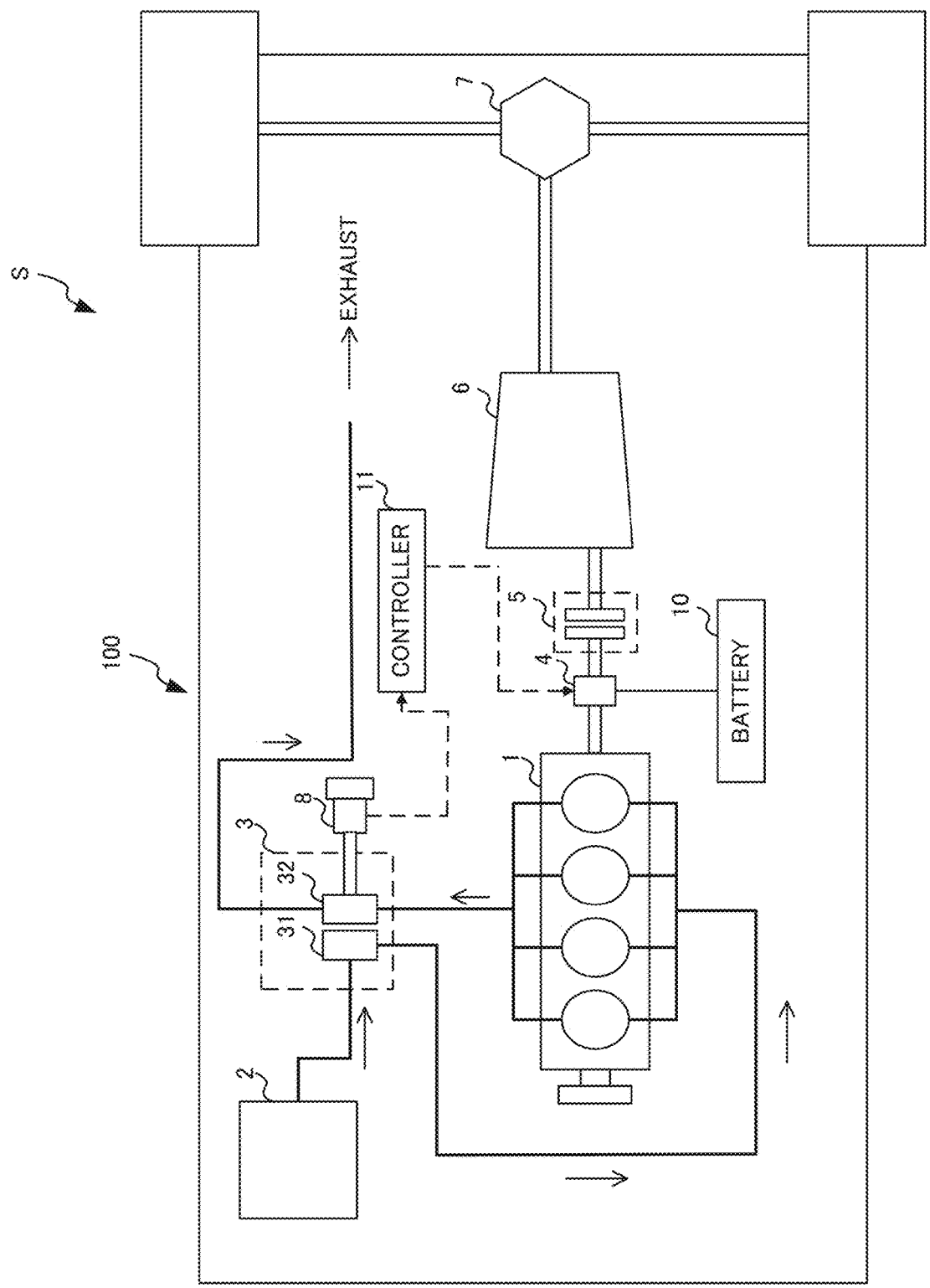
FIG. 6 shows a configuration of a vehicle according to an embodiment.

FIG. 5 is a flowchart showing a processing procedure for controlling the motor 4 performed by the controller 11. This processing procedure starts, for example, when the vehicle 100 is traveling. First, the control part 115 acquires the rotational speed of the engine 1 measured by the tachometer 21 (S101). The control part 115 identifies an engine torque on the basis of the acquired rotational speed of the engine 1.

The control part 115 determines whether or not the acquired rotational speed of the engine 1 is equal to or greater than a rotation threshold R (S102). If the rotational speed of the engine 1 is equal to or greater than the rotation threshold R (YES in S102), the control part 115 determines whether or not the identified engine torque is equal to or greater than a torque threshold T (S103). If the engine torque is equal to or greater than the torque threshold value T (YES in S103), the control part 115 guides a portion of the exhaust to the bypass circuit W by using the switching part 9. When the exhaust guided to the bypass circuit W passes through it, the turbine of the generator 8 rotates, whereby the generator 8 generates electric power and supplies the electric power from the generator 8 to the stator coils 41a to 41c (S104).

The control part 115 performs field weakening control that reduces a magnetic flux density of an air gap of the motor 4 by suppling the electric power generated by the generator 8 to the stator coils 41a to 41c (S105). The control part 115 determines whether or not the traveling of the vehicle 100 has ended (S106). If it is determined that the traveling of the vehicle 100 has ended (YES in S106), the control part 115 ends the process.

If the rotational speed of the engine 1 is less than the rotation threshold R in the determination of S102 (NO in S102), the control part 115 proceeds to the determination of S106. If the engine torque is less than the torque threshold T in the determination in 5103 (NO in S103), the control part 115 supplies electric power from the battery 10 to the stator coils 41a to 41c (S107), thereby executing the weakening field control for reducing the magnetic flux density of the air gap of the motor 4 (S105), and proceeds to the determination in S106. If it is determined that the traveling of the vehicle 100 has not ended (NO in S106), the control part 115 returns to the process in S101.

Effect of the Controller 11 of the Present Embodiment

By supplying the electric power generated by the generator 8 to the motor 4, the control part 115 generates the magnetic flux that reduces the magnetic flux density of the air gap of the motor 4. In this manner, since the control part 115 suppresses the generation of back electromotive force due to rotation of the rotor in the motor 4, the control part 115 can suppress an increase in the rotational resistance of the motor 4. At this time, since the control part 115 supplies, to the stator coils 41a to 41c, the electric power generated by the generator 8 using the exhaust from the engine 1, the energy efficiency of the vehicle 100 can be improved as compared with the case where the electric power from the battery 10 is supplied to the stator coils 41a to 41c.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. A drive system comprising:
   a motor that includes stator coils and a rotor having permanent magnets;
   a battery that supplies electric power to the stator coils of the motor;
   an engine that rotates a drive shaft connected to the rotor to generate a driving force of a vehicle;
   a generator that generates electric power by using exhaust of the engine;
   a control part that controls a power source of the electric power to be supplied to the stator coils, wherein the control part supplies the electric power generated by the generator to the stator coils when an operating state of the engine satisfies a predetermined condition; and
   a switching part that guides the exhaust from the engine to a bypass circuit for discharging the exhaust to the outside without passing through a turbine of a turbocharger,
   wherein
      the generator is provided in the bypass circuit, and
      the control part guides the exhaust to the bypass circuit with the switching part in a state where a rotational speed of the engine is equal to or greater than a rotation threshold value and an engine torque is equal to or greater than a torque threshold value.

2. The drive system according to claim 1, wherein the control part supplies electric power from the battery to the stator coils without guiding the exhaust to the bypass circuit with the switching part in a state where the rotational speed of the engine is equal to or greater than the rotation threshold value and the engine torque is less than the torque threshold value.

3. The drive system according to claim 1, wherein the generator is provided on the same shaft as the turbine of the turbocharger, and generates electricity by rotating together with the turbine, and
   the control part supplies the electric power generated by the generator to the stator coils if the rotational speed of the engine is equal to or greater than a rotation threshold and the engine torque is equal to or greater than a torque threshold, and does not supply the electric power generated by the generator to the stator coils if the rotational speed of the engine is equal to or greater than the rotation threshold and the engine torque is less than the torque threshold.

4. The drive system according to claim 3, wherein the control part applies an output voltage of the generator to a three-phase inverter and supplies electric power to the stator coils through the three-phase inverter if the rotational speed of the engine is equal to or greater than the rotation threshold value and the engine torque is equal to or greater than the torque threshold value.

5. A drive system comprising:
   a motor that includes stator coils and a rotor having permanent magnets;
   a battery that supplies electric power to the stator coils of the motor;
   an engine that rotates a drive shaft connected to the rotor to generate a driving force of a vehicle;
   a generator that generates electric power by using exhaust of the engine; and
   a control part that controls a power source of the electric power to be supplied to the stator coils, wherein the control part supplies the electric power generated by the generator to the stator coils when an operating state of the engine satisfies a predetermined condition,
   wherein
      the generator is provided on a same shaft as a turbine of a turbocharger, and generates electricity by rotating together with the turbine,
      the control part supplies the electric power generated by the generator to the stator coils if a rotatonal speed of the engine is equal to or greater than a rotation threshold and engine torque is equal to or greater than a torque threshold, and does not supply the electric power generated by the generator to the stator coils if the rotational speed of the engine is equal to or greater than the rotation threshold and the engine torque is less than the torque threshold, and the control part does not perform control of supplying electric power from the battery to the stator coils in order to reduce a magnetic flux density of an air gap of the motor, and does not supply the electric power generated by the generator to the stator coils if the rotational speed of the engine is less than a rotation threshold value.

6. The drive system according to claim 5, wherein the control part applies an output voltage of the generator to a three-phase inverter and supplies electric power to the stator coils through the three-phase inverter if the rotational speed of the engine is equal to or greater than the rotation threshold value and the engine torque is equal to or greater than the torque threshold value.

\* \* \* \* \*